United States Patent
Wu

(10) Patent No.: US 8,082,581 B2
(45) Date of Patent: *Dec. 20, 2011

(54) MANAGEMENT OF SESSION TIMEOUTS IN AN SSL VPN GATEWAY

(75) Inventor: Yuhua Wu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/964,436

(22) Filed: Dec. 9, 2010

(65) Prior Publication Data

US 2011/0078280 A1     Mar. 31, 2011

Related U.S. Application Data

(63) Continuation of application No. 11/166,778, filed on Jun. 27, 2005, now Pat. No. 7,873,994.

(51) Int. Cl.
*H04L 29/00* (2006.01)

(52) U.S. Cl. ............................ 726/14; 713/151; 713/152

(58) Field of Classification Search .................... 726/14; 713/151, 152
See application file for complete search history.

(56) References Cited

U.S. PATENT DOCUMENTS

| | | | |
|---|---|---|---|
| 5,761,683 A | 6/1998 | Logan et al. | |
| 6,493,719 B1 | 12/2002 | Booth et al. | |
| 6,557,038 B1 | 4/2003 | Becker et al. | |
| 6,725,380 B1 * | 4/2004 | Forlenza et al. | 726/6 |
| 7,024,556 B1 | 4/2006 | Hadjinikitas et al. | |
| 7,043,752 B2 | 5/2006 | Royer et al. | |
| 7,085,832 B2 | 8/2006 | Briscoe et al. | |
| 7,103,666 B2 | 9/2006 | Royer et al. | |
| 7,225,407 B2 | 5/2007 | Sommerer et al. | |
| 7,353,249 B2 | 4/2008 | Takahashi | |
| 7,444,508 B2 | 10/2008 | Karjala et al. | |
| 7,461,262 B1 * | 12/2008 | O'Toole, Jr. | 713/182 |
| 2003/0018887 A1 | 1/2003 | Fishman et al. | |
| 2004/0167881 A1 | 8/2004 | Masuda | |
| 2004/0193699 A1 | 9/2004 | Heymann et al. | |
| 2004/0218739 A1 * | 11/2004 | Nicol | 379/93.33 |
| 2006/0224883 A1 | 10/2006 | Khosravi et al. | |

OTHER PUBLICATIONS

Co-pending U.S. Appl. No. 11/166,778, filed Jun. 27, 2005 entitled "Management of Session Timeouts in an SSL VPN Gateway", by Yuhua Wu, 33 pages.

* cited by examiner

*Primary Examiner* — Carl Colin
*Assistant Examiner* — Harunur Rashid
(74) *Attorney, Agent, or Firm* — Harrity & Harrity, LLP

(57) ABSTRACT

A network device may manage communication sessions with clients so that attempts at the client to automatically keep the session alive can be ignored for purposes of timing out the session. The device may examine resource requests received from the client as uniform resource locators (URLs) and determine whether the URLs include a context variable. The device may determine whether to reset a timeout period for the communication session based on a presence of the context variable in the URL. At the client side, the context variable may be attached to URLs that are part of functions configured to automatically access the network device.

20 Claims, 6 Drawing Sheets

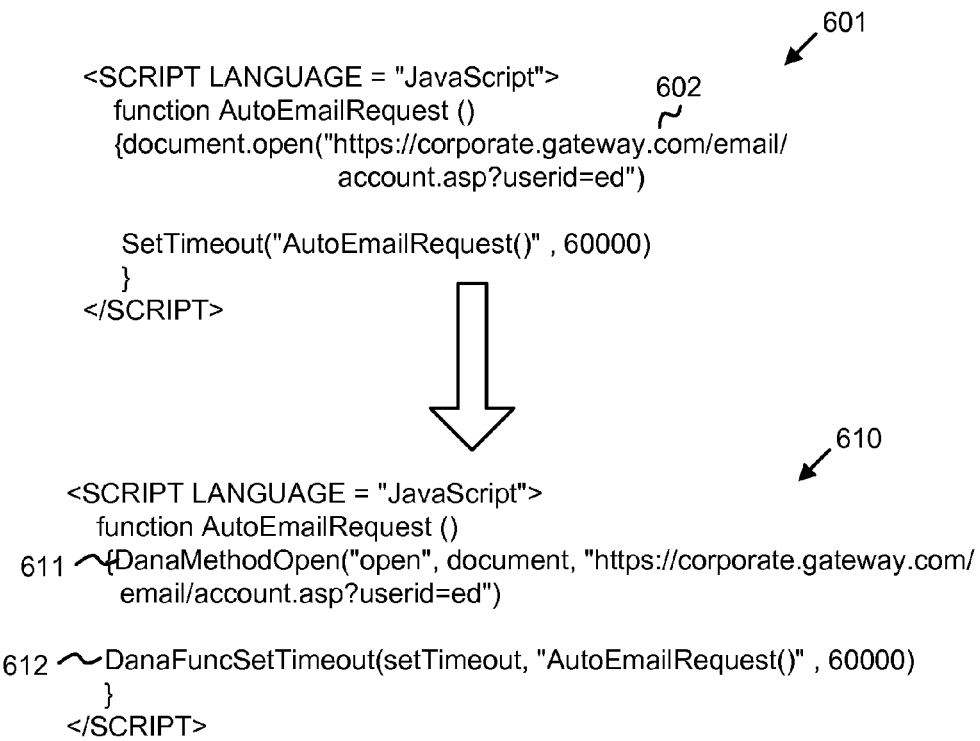

MANAGEMENT OF SESSION TIMEOUTS IN AN SSL VPN GATEWAY

CROSS-REFERENCE TO RELATED APPLICATIONS

This application is a continuation of U.S. patent application Ser. No. 11/166,778, filed Jun. 27, 2005, the disclosure of which is incorporated by reference herein.

BACKGROUND

1. Field of the Invention

Principles of the invention relate generally to network security and, more particularly, to managing session timeouts in a network device.

2. Description of Related Art

A corporation may protect its network in a number of different ways. For example, a corporate security infrastructure may include firewalls, intrusion detection, Uniform Resource Locator (URL) filtering, and content inspection. Further, corporations may enforce certain procedures that must be followed by employees who wish to use processing devices to access the corporate network from within the office.

Telecommuters, mobile employees, remote business partners, etc. may desire remote access to a corporate network. At least some of these users may wish to access the corporate network over the Internet or via another network or group of networks.

One class of secure remote access technology that is gaining in popularity is the so-called Secure Sockets Layer (SSL) Virtual Private Network (VPN) connection. SSL VPNs compete with IP Security Protocol (IPSec) VPNs and have a number of potential advantages over IPSec VPNs, including application access flexibility, high security, and overall simplicity.

SSL VPNs may be implemented through an SSL VPN gateway device, which makes client/server applications available to remote users ("clients") through standard Internet browser software. The "back-end" server devices in a corporate network can securely connect with remote clients using security provided through an SSL connection, which is typically a standard feature in browsers. The SSL VPN gateway may operate in the application layer to communicate with the back-end servers and then transmit the information obtained from the back-end servers to the client's web browser. The back-end servers may be executing various corporate applications. The SSL VPN gateway may use built-in "screen scraping" protocols to split the emulation and display processing of the corporate applications so that only the applications' display is sent to the client browser. In this manner, corporate resources/applications can be made available to remote clients without requiring significant customization of the client computers.

One security policy that is frequently enforced in SSL VPN gateways is one that automatically logs users out after a predetermined time period of inactivity (a "timeout"). For instance, if a user walks away from a computer but forgets to log out, by timing out the client, the client will not be indefinitely connected to the protected corporate intranet. Accordingly, it is desirable to ensure that this type of automatic logout based on user inactivity is as accurate as possible in detecting when a user becomes inactive.

SUMMARY OF THE INVENTION

One aspect is directed to a method that includes receiving a resource request as part of a secure communication session with a client and determining whether the resource request includes a URL that includes a context variable. The method further includes determining whether to reset a timeout period for the communication session based on a presence of the context variable in the URL.

Another aspect is directed to a network device that includes a processor and a computer memory operatively coupled to the processor. The computer memory includes programming instructions configured to establish a session between the network device and a client device. The computer memory further includes programming instructions configured to examine a resource request received from the client device and instructions configured to reset a timeout period for the session between the network device and the client device based on whether the examined resource request includes a context. The context is inserted into the resource request independently of an initial implementation of the resource request.

Yet another aspect is directed to a computer-implemented method that includes scanning scripts present in hyper-text markup language (HTML) for functions that execute automatically. The method further includes examining the code executed by the functions to locate resource requests to a remote server. Further, the method includes attaching a context to the located resource requests, the context indicating the resource request was generated by a function configured to automatically access the remote server.

Yet another aspect is directed to a system that includes a security application installed on a client device and a gateway application. The security application is configured to attach context information to a resource request for a remote resource requested from a browser application when the resource request is automatically generated by a function. The gateway device is configured to determine whether to reset a session timeout value for the client device based on whether the context information is included in the resource request.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is a diagram of an exemplary table that may be used by the security application shown in FIG. 3 when scanning for a predetermined list of functions;

FIG. 6 is a diagram illustrating an exemplary portion of JavaScript to which the acts of FIG. 4 may be applied.

DETAILED DESCRIPTION

The following detailed description of the invention refers to the accompanying drawings. The same reference numbers in different drawings may identify the same or similar elements. Also, the following detailed description does not limit the invention.

As described herein, a network device implements an SSL VPN gateway for client devices. Context information is attached at the client to resource requests when the resource requests are generated automatically for the purpose of, for example, keeping a session alive. The context information can be used by the SSL VPN gateway to determine whether a session timeout period should be reset.

System Overview

Figure 1:
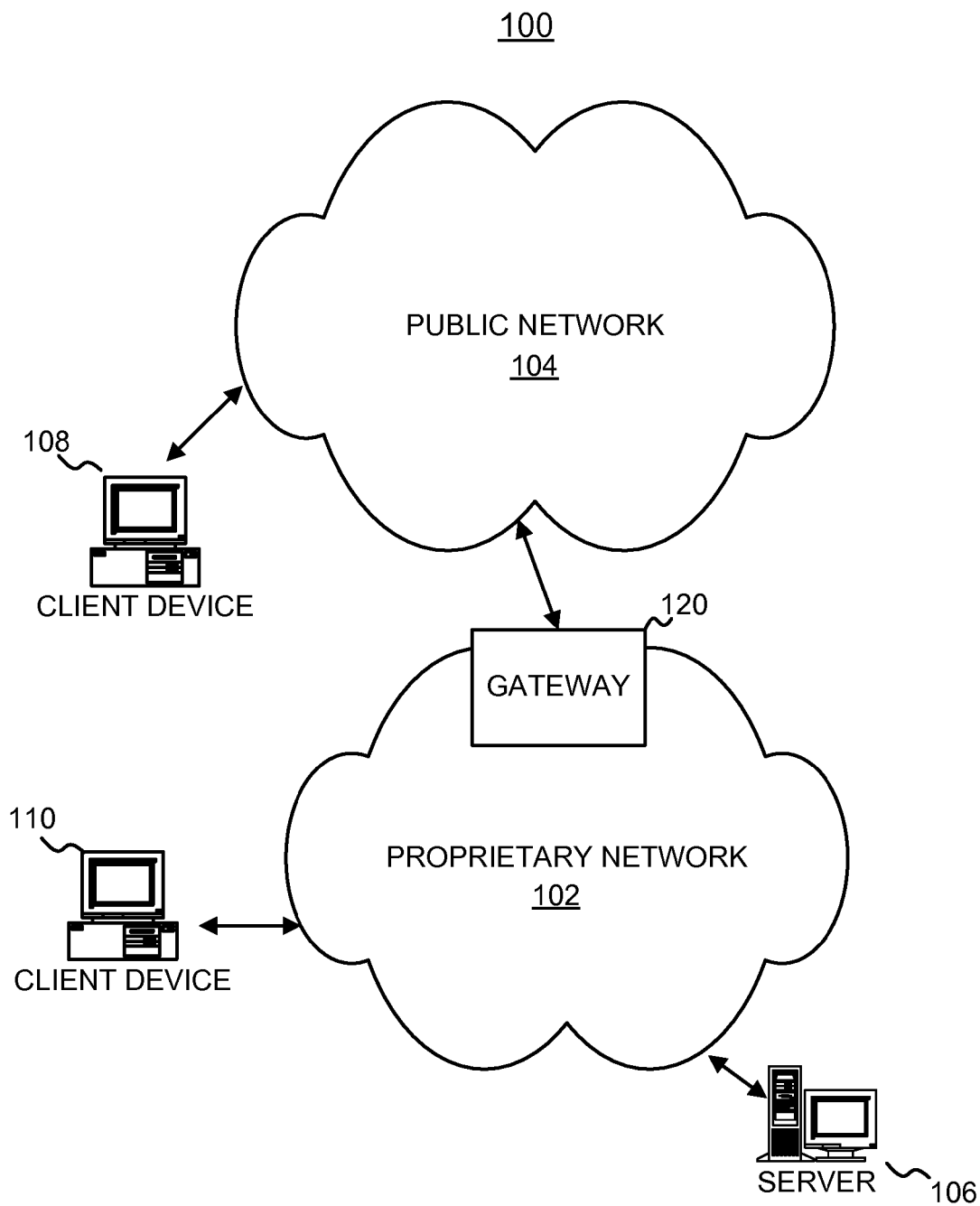
FIG. 1 is an exemplary diagram of a system in which concepts consistent with the principles of the invention may be implemented.

FIG. 1 illustrates an exemplary system 100 in which concepts consistent with the principles of the invention may be implemented. System 100 may include a proprietary network 102, a second network 104, a server 106, client devices 108 and 110, and a gateway 120. Proprietary network 102 may include one or more networks, such as a local area network (LAN), a wide area network (WAN), or the like. Proprietary network 102 may be a secure network (e.g., network 102 may be protected by network firewalls and/or security procedures). Network 104 may include a LAN, a WAN, a telephone network, such as the Public Switched Telephone Network (PSTN), a wireless network, or a combination of networks. In one implementation, proprietary network 102 may be, for example, a corporate network and network 104 may be, for example, the Internet.

Client devices 108 and 110 may be processing devices, such as personal computers (PCs), laptop computers, personal digital assistants (PDAs), cell phones, or other types of devices that users use to connect to networks 102 and 104. Server 106 and gateway 120 may also include a processing device or multiple distributed processing devices.

For clarity, only two client devices 108 and 110, one gateway 120, and one server 106 are shown in FIG. 1. One of ordinary skill in the art will recognize that an actual system of these devices may include additional client devices, gateways, and servers.

Clients 108 and 110 and may wish to connect to network 104 to access publicly available resources, such as web pages being served by public web servers. Clients 108 and 110 may also connect to proprietary resources stored on network 102, such as, in the situation when network 102 is a corporate network, proprietary corporate resources, such as corporate web pages, email applications, or other corporate data or corporate applications. These proprietary corporate resources may be hosted by processing device(s) such as server 106. Client device 110 may connect directly to server 106 over the secure proprietary network 102. Client 108, however, because it connects to proprietary network 102 via public network 104, may connect to server via gateway 120. Gateway 120 may generally assist in providing security functions for proprietary network 102.

Figure 2:
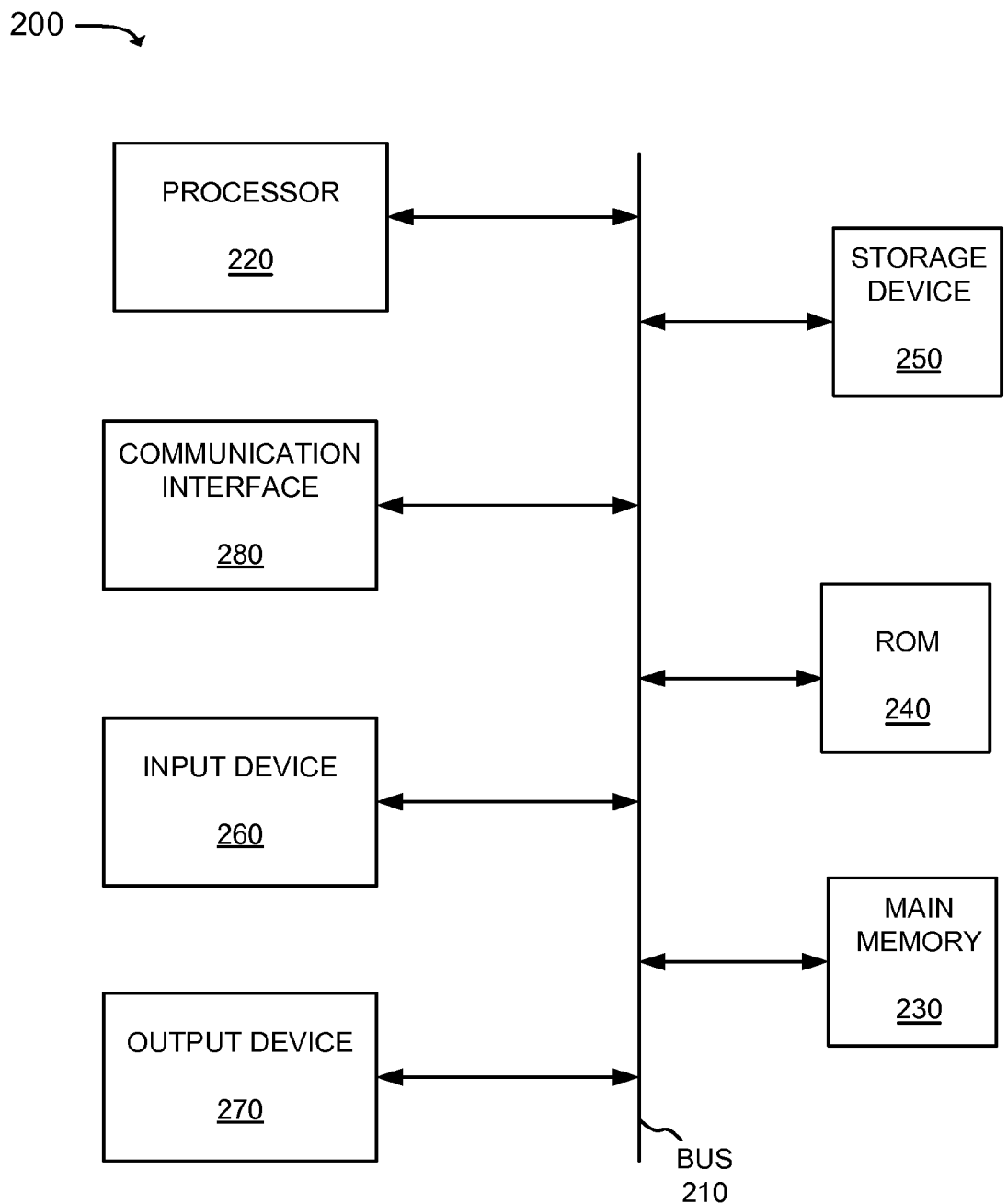
FIG. 2 is a functional block diagram that illustrates an exemplary processing device that may be used to implement the client devices, gateway, and/or server shown in FIG. 1.

FIG. 2 is a functional block diagram that illustrates an exemplary processing device 200 that may be used to implement client devices 108/110, gateway 120, and/or server 106. Device 200 may include a bus 210, a processor 220, a memory 230, a read only memory (ROM) 240, a storage device 250, an input device 260, an output device 270, and a communication interface 280. Bus 210 may permit communication among the components of device 200.

Processor 220 may include one or more conventional processors or microprocessors that interpret and execute instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of magnetic or optical recording medium and its corresponding drive, such as a magnetic disk or optical disk and its corresponding disk drive.

Input device 260 may include one or more mechanisms that permit a user to input information to system 200, such as a keyboard, a mouse, a pen, a biometric mechanism, such as a voice recognition device, etc. Output device 270 may include one or more mechanisms that output information to the user, including a display, a printer, etc. Communication interface 280 may include any transceiver-like mechanism that enables device 200 to communicate via a network. For example, communication interface 280 may include mechanisms for communicating with other networked devices and/or systems via wired, wireless or optical connections.

Device 200 may perform functions in response to processor 220 executing sequences of instructions contained in a computer-readable medium, such as memory 230. A computer-readable medium may include one or more memory devices and/or carrier waves. Such instructions may be read into memory 230 from another computer-readable medium, such as storage device 250, or from a separate device via communication interface 280.

Execution of the sequences of instructions contained in memory 230 may cause processor 220 to perform certain acts that will be described hereafter. In alternative implementations, hard-wired circuitry may be used in place of or in combination with software instructions to implement the present invention. Thus, the present invention is not limited to any specific combination of hardware circuitry and software.

SSL VPN Gateway

Gateway 120 may, for example, authorize client devices wishing to access resources of proprietary network 102 and screen data passing between proprietary network 102 and public network 104. In one implementation, gateway 120 may assist client device 108 in connecting to proprietary network 102 using an SSL VPN.

Figure 3:
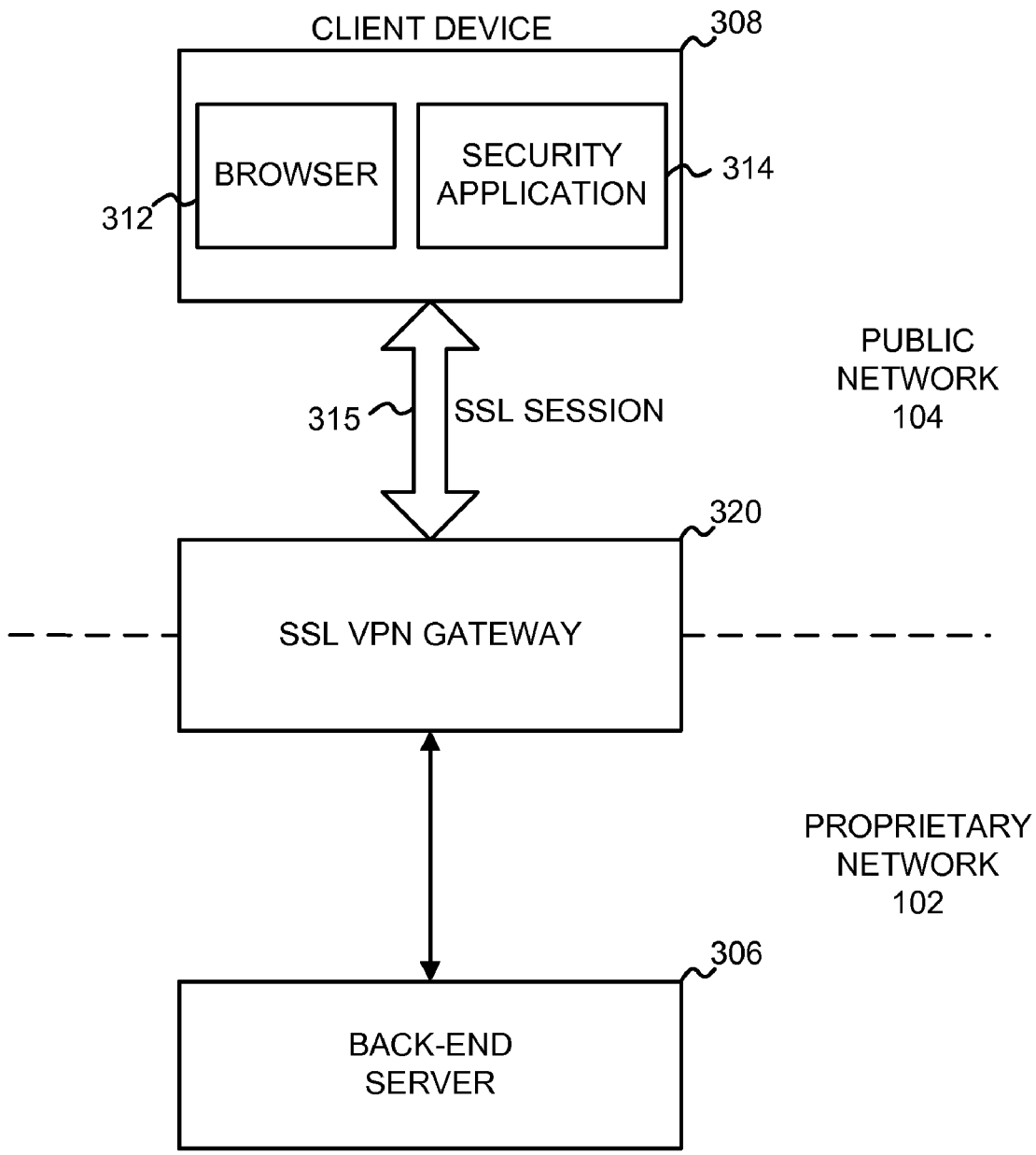
FIG. 3 is a diagram conceptually illustrating an exemplary SSL VPN.

FIG. 3 is a diagram conceptually illustrating an exemplary SSL VPN connection between a client device 308, such as a remote client computer, and a back-end server 306, via an SSL VPN gateway 320. Client device 308, back-end server 306, and SSL VPN gateway 320 may correspond to client device 108, back-end server 106, and gateway 120 in FIG. 1. Back-end server 306 may provide applications or services targeted to the users of the proprietary network in which back-end server 306 resides. Client device 308 may connect to back-end server 306 through SSL VPN gateway 320 to access these applications or services. For example, back-end server 306 may act as an email server or as a database application through which users can access a customer database. Client device 308 may connect to SSL VPN gateway 320 via an SSL web connection 315 using a browser program 312. Browser programs, such as the Internet Explorer browser from Microsoft Corporation, are common applications on computer systems. Additionally, because most browsers include support for encrypted communications using SSL, client device 308 may require little, if any, custom configuration before being ready to connect with SSL VPN gateway 320.

Accordingly, by connecting to SSL VPN gateway 320 using a web browser, client device 308 can connect to proprietary network 102 by simply navigating to a predetermined Uniform Resource Locator (URL) of SSL VPN gateway 320. SSL VPN gateway 320 may use "screen scraping" protocols to split the emulation and display processing of the services/applications on back-end server 306 so that the application's display is sent to client device 308 as a graphic representation that can be displayed at browser 312. In some implementations, client device 308, upon first login at SSL VPN gateway 320, may download a security application 314 (e.g., a Java applet) that acts as a browser enhancement and that assists in communicating with SSL VPN gateway 320. In other implementations, security application 314 may be pre-configured on client device 308.

Security application 314 may assist communications with SSL VPN gateway 320 in a number of ways. For example, when the user of client device 308 first connects with proprietary network 102, security application 314 may download security checking code and/or data that may execute on client device 308 and check client device 308 for security breaches, such as the presence of viruses, trojans, or key-logging programs. Additionally, as will be described in more detail below, security application 314 may assist SSL VPN gateway 320 in handling session timeouts for the connection of client device 308 to SSL VPN gateway 320.

System Operation

SSL VPN gateway 320 may keep track of a timeout period for each SSL session 315 that is established with SSL VPN gateway 320. The timeout period relates to how long session 315 will be kept open without any user interaction with back-end server 306. Whenever the user interacts with back-end server 306 in an approved manner, the current value of the timeout period may be reset to zero. Whether to implement a session timeout and the length of the timeout value may be configurable by an administrator of SSL VPN gateway 320. Implementing a timeout period for users can be important for network security because leaving a session open for an extended length of time even when the user is not actively using the session (and may no longer be at the client device) can expose back-end server 306 and/or the session to malicious users.

Either intentionally or unintentionally, the user of client device 308 may attempt to circumvent the timeout period by using browser-based scripts to automatically query back-end server 306 at a predetermined interval. Client device 308 and SSL VPN gateway 320, consistent with an aspect of the invention, may be configured to disable such attempts to circumvent the timeout period.

Figure 4:
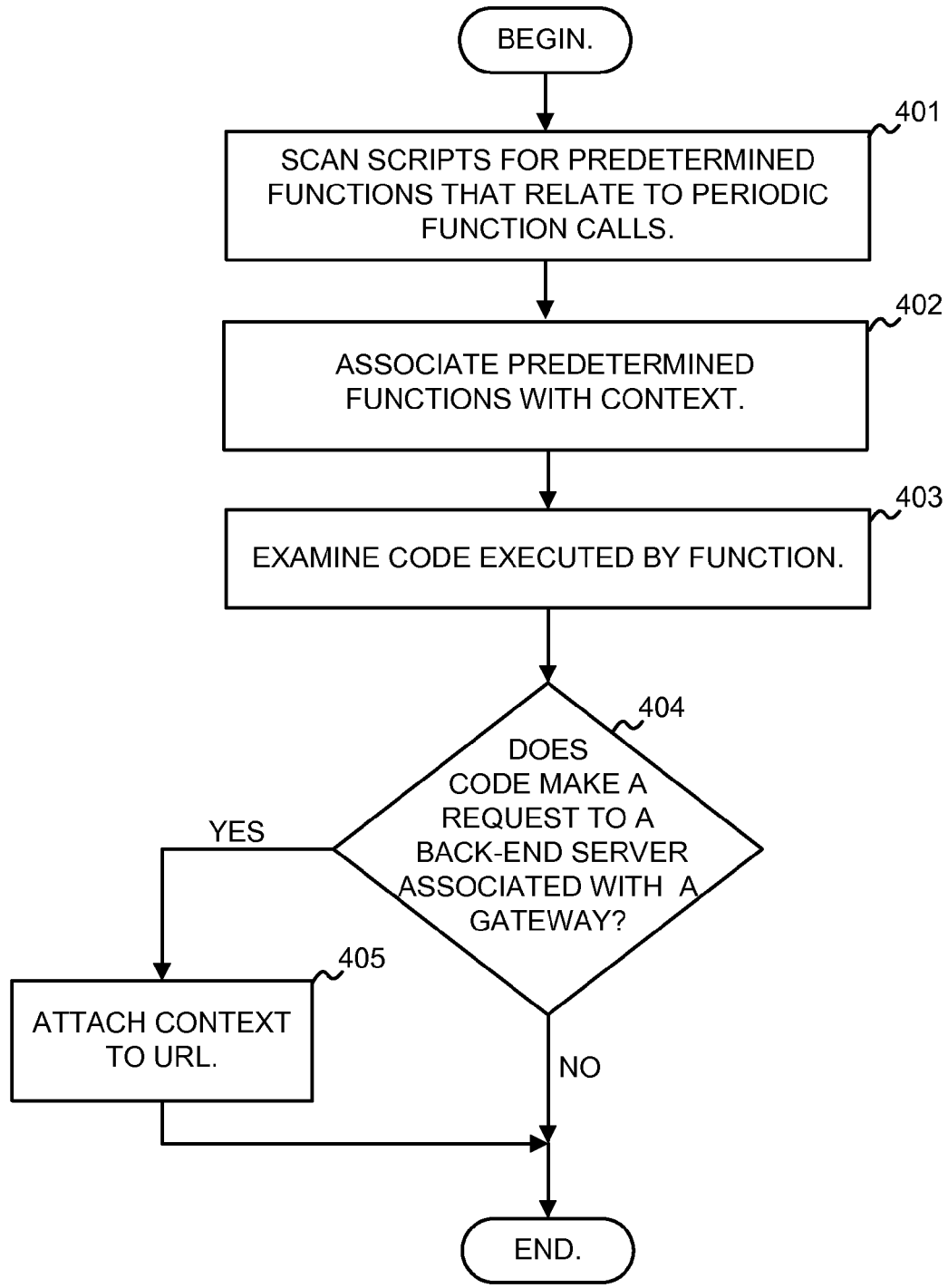
FIG. 4 is a flow chart illustrating exemplary operations for handling session timeouts for an SSL VPN connection.

FIG. 4 is a flow chart illustrating exemplary operations at client 308 for handling session timeouts for an SSL VPN connection. Security application 314 may rewrite frames, such as frames in pages of hyper-text markup language (HTML), to monitor or watch scripts that are to be executed by browser 312. More particularly, security application 314 may scan scripts that are to be executed by client device 308 for a predetermined list of functions that are known to make automatic, periodic function calls (act 401).

FIG. 5 is a diagram of an exemplary table 500 that may be used by security application 314 when scanning for the predetermined list of functions. Table 500 may include a number of entries, each of which defines a function that is known to make periodic calls. For example, entry 501 identifies the JavaScript function "SetTimeout" as such a function. Entry 502 identifies the JavaScript function "SetInternal" as such a function. The "SetTimeout" function is a JavaScript function that delays the evaluation of an expression or the execution of a function by a predetermined period. The JavaScript "SetInterval" function allows for the evaluation of an expression or execution of a function at set intervals. Using table 500, security application 314 may scan JavaScript that is to be executed by browser 312 for "SetTimeout" and "SetInterval" functions.

Scripting languages other than JavaScript, such as VBScript or other scripting languages designed to be embedded in web pages and executed by a browser, may be included in table 500. Although the examples discussed herein are in the context of JavaScript, one of ordinary skill in the art will realize that the described concepts could be extended in a straightforward manner to other languages.

The functions identified in act 401 may be associated with a context (act 402). The context may be implemented by wrapping the function in a custom function that instantiates the context. The context may later be used to identify a request associated with the identified function to SSL VPN gateway 320. In one implementation, the context may be a variable that is named based on the name of the identified function and based on the time period associated with the function. For example, for a SetTimeout function in which the delay period is set to 50 seconds (50,000 milliseconds), the context variable may be "ContextVariableSetTimeout=50000".

The functions identified in act 401 are associated with code that results in the evaluation of an expression or the execution of a function. The code may be examined by other custom functions and a determination made as to whether the code will affect back-end server 306 (acts 403 and 404). If it is determined that the code will affect back-end server 306, the context is attached to a URL associated with the code (act 405). As will be described in more detail below with reference to FIG. 7, the context may be used by SSL VPN gateway 320 in making a decision of whether to reset a session timeout period.

The determination of whether the code will affect back-end server 306 (act 404) can be made using a number of different techniques. For example, methods in the code can compared to a list of predetermined methods that are known to be able to affect back-end server 306. Examples of such methods include the "document.open( )" method, where the argument for this method is a URL that is to be opened.

FIG. 6 is a diagram illustrating an exemplary portion of JavaScript to which the acts of FIG. 4 may be applied. For this example, assume that script 601 is to be processed by security application 314. The script 601 includes a function "AutoEmailRequest" that includes the "SetTimeout" function. The "SetTimeout" function recursively calls the "AutoEmailRequest" function every 60,000 milli-seconds (60 seconds). In this manner, after the function is initially called, it will continue to be automatically called every 60 seconds. The function also includes a method "document.open( )" that opens the URL 602. Assume that URL 602 causes SSL VPN gateway 320 to check an email server. Accordingly, this function may be used to automatically check the corporate email server for activity every 60 seconds.

Script 610 is an example of script 601 after being rewritten to include custom functions in act 402. In this example, the custom functions are the functions named "DanaMethodOpen" and "DanaFuncSetTimeout." DanaMethodOpen 611 is a custom function that serves as a wrapper for "document.open." As its arguments, DanaMethodOpen 611 indicates that it is a wrapper for the document.open method and it includes the URL 602 that was included with the original document.open method. DanaFuncSetTimeout 612 is another custom function that serves as a wrapper for the function setTimeout. As its arguments, DataFuncSetTimeout 612 indicates that is a wrapper for the setTimeout function and includes the arguments included with the original setTimeout function.

In operation, when AutoEmailRequest is called by the client during normal execution, it will call DanaMethodOpen 611 and DanaFuncSetTimeout 612. The function DanaFuncSetTimeout 612, when called, may create a context variable that is associated with AutoEmailRequest. For example, the context variable created by DanaFuncSetTimeout 612 may be DataTimeoutCtx=60000. DataMethodOpen 611, when called, may check whether the context variable is set to a valid value. If so, it may attach the context variable to the URL and call the document.open method. In this example, the document.open method may be called with the URL "https://corporate.gateway.com/email/account?-userid=ed&DataTimeoutCtx=60000."

In summary, in the example of FIG. 6, script 601 is rewritten as script 610 after scanning script 601 for a list of predetermined functions (e.g., setTimeout) that are automatically or periodically called. The located function is rewritten with a custom function that sets a context variable and then calls the AutoEmailRequest function that was originally called by setTimeout. Because the document.open method, which is called by the original setTimeout function, makes a request to the back-end server, this method is also rewritten to a function that, when executed, checks for the existence of the context variable, and if the context variable is present and set to a valid value, attaches the context variable to the called URL.

The custom function names and context variable names illustrated in FIG. 6 are purely exemplary. One of ordinary skill in the art will recognize that any names could be used to call implement similar or identical functionality.

Figure 7:
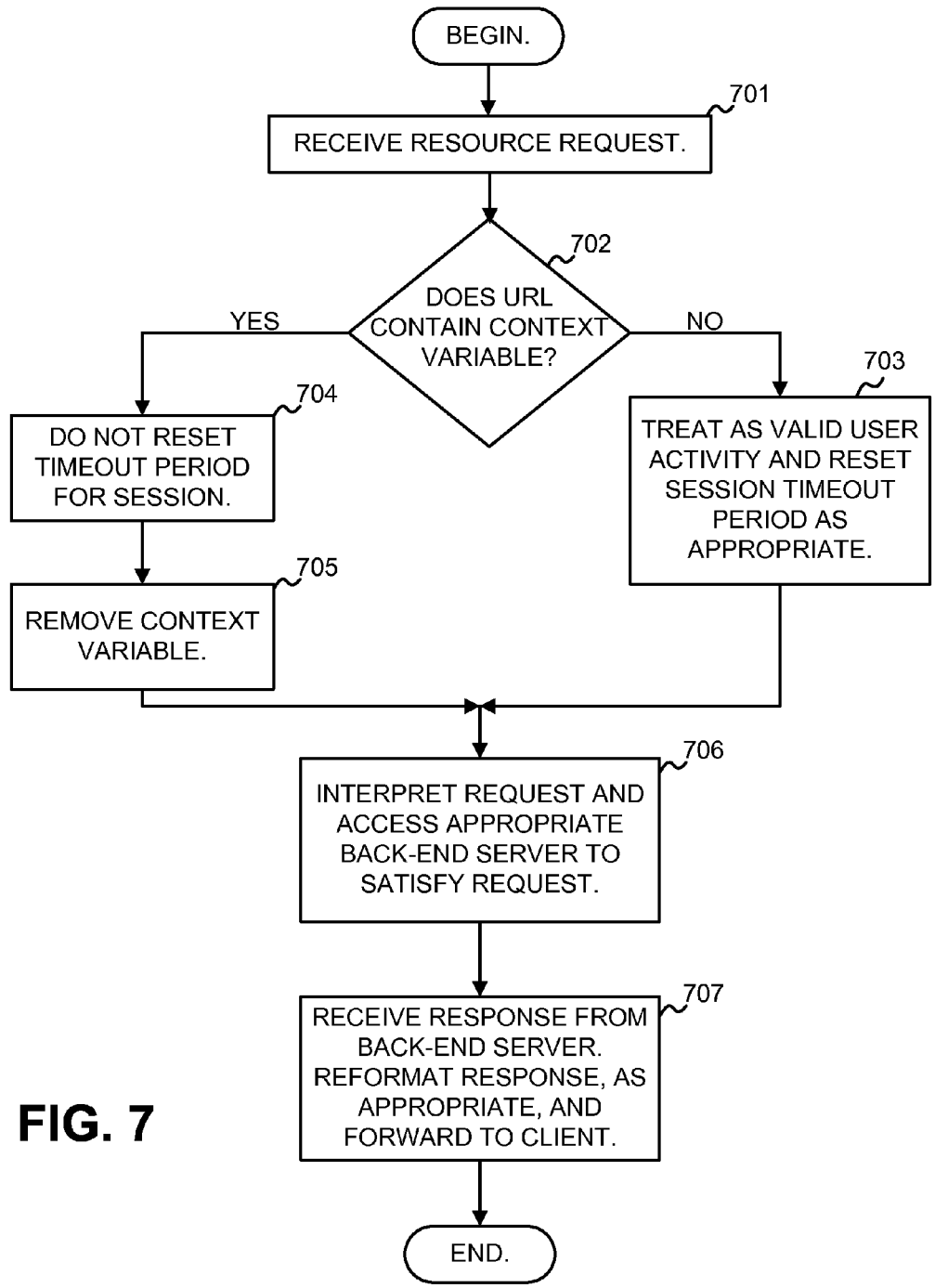
FIG. 7 is a flow chart illustrating exemplary operations that may be performed at SSL VPN gateways for handling session timeouts.

FIG. 7 is a flow chart illustrating exemplary operations that may be performed at SSL VPN gateway 320 for handling session timeouts. As previously mentioned, client device 308 may generate requests for resources at back-end server 306. The requests may be in the form of URL requests transmitted using the HTTPS protocol. SSL VPN gateway 320 may receive the requests (act 701), and for each request, determine whether the request contains a context variable (act 702). For example, SSL VPN gateway 320 may scan the URL included in the request for a context variable name, such as, in the example of FIG. 6, the context variable "DataTimeoutCtx."

If no context variable is located, the request may be treated as valid user activity and the session timeout period for the user may be reset (acts 702 and 703). For example, if the session timeout period is set so that a client is automatically logged out after ten minutes, and there has currently been five minutes of no activity, the session timeout period may be reset so that there will be ten more minutes remaining until the client is automatically logged out.

On the other hand, when a context variable is located (act 702), the timeout period is not reset and the timeout period may continue to run (act 704). Additionally, the context variable may be removed from the URL (act 705).

SSL VPN gateway 320 may interpret the request and access an appropriate back-end server 306 to satisfy the request (act 706). For example, in the request shown in FIG. 6, SSL VPN gateway 320 may query a corporate email program for new email messages.

SSL VPN gateway 320 may receive a response from the accessed back-end server 306 and forward the response to client device 308 (act 707). If needed, the response may be reformatted for client device 308, such as by reformatting information from a non-web application, such as a mail server, into a format that can be sent in HTML format to client device 308.

CONCLUSION

As described above, an SSL VPN gateway provides security and accessibility features of existing SSL VPN gateways and additionally includes the ability to intelligently determine when to treat user requests as genuine user requests that reset the session timeout period. With this feature, an SSL VPN gateway can enhance session security of a client.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code or hardware design—it being understood that a person of ordinary skill in the art would be able to design software and control hardware to implement the aspects based on the description herein.

The foregoing description of embodiments of the invention provides illustration and description, but is not intended to be exhaustive or to limit the invention to the precise form disclosed. Modifications and variations are possible in light of the above teachings or may be acquired from practice of the invention. For example, although some of the operations described above were described in a particular order, the operations may be amenable to being performed simultaneously or in different orders to still achieve the same or equivalent results.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise.

What is claimed:

1. A device comprising:
   an input/output mechanism to receive, from a downstream client device, a resource request for a remote resource, where the resource request includes context information that indicates whether the resource request is automatically generated by a periodically-called function; and
   a processor to:
      determine whether the context information indicates that the resource request was automatically generated by a periodically-called function, and
      refrain, in response to determining that the resource request was automatically generated by a periodically-called function, from resetting a session timeout value associated with providing the remote resource to the client device.

2. The device of claim 1, where the client device and the device communicate over a secure sockets layer (SSL) connection.

3. The device of claim 2, where the device is an SSL virtual private network (VPN) gateway.

4. The device of claim 1, where the client device executes scripting language to call the periodically-called function.

5. The device of claim 1, where the resource request includes a uniform resource locator (URL).

6. The device of claim 5, where the context information includes a context variable appended to the URL.

7. The device of claim 1, where the context variable includes an indication of a periodicity of the resource request.

8. A non-transient computer-readable medium to store instructions executable by a processor of a computer device, the instructions comprising:
- an instruction to receive, from a client device, a resource request for a remote resource, where the resource request includes context information that indicates whether the resource request is automatically generated by a periodically-called function;
- an instruction to determine, based on the context information, that the resource request was automatically generated by a periodically-called function; and
- an instruction to refrain, in response to determining that the resource request was automatically generated by a periodically-called function, from resetting a session timeout value associated with providing the remote resource to the client device.

9. The non-transient computer-readable medium of claim 8, where the computer device and the client device communicate over a secure sockets layer (SSL) connection.

10. The non-transient computer-readable medium of claim 9, where the computer device is an SSL virtual private network (VPN) gateway.

11. The non-transient computer-readable medium of claim 8, where the client device executes scripting language to call the periodically-called function.

12. The non-transient computer-readable medium of claim 8, where the resource request includes a uniform resource locator (URL).

13. The non-transient computer-readable medium of claim 12, where the context information includes a context variable appended to the URL.

14. The non-transient computer-readable medium of claim 8, where the context variable includes an indication of a periodicity of the resource request.

15. A method comprising:
- receiving, by a computer device and from a client device, a resource request for a remote resource, where the resource request includes context information that includes an indication of a periodicity of the resource request; and
- refraining from resetting, by the computer device and in response to determining that the resource request includes the context information that includes the indication of the periodicity of the resource request, a session timeout value associated with providing the remote resource to the client device.

16. The method of claim 15, where the computer device and the client device communicate over a secure sockets layer (SSL) connection.

17. The method of claim 16, where the computer device is an SSL virtual private network (VPN) gateway.

18. The method of claim 15, where the client device executes scripting language to call a periodically called function associated with the resource request.

19. The method of claim 15, where the resource request includes a uniform resource locator (URL).

20. The method of claim 19, where the context information includes a context variable appended to the URL.

* * * * *